Oct. 6, 1925.
1,556,228
J. M. LEWIS
PARCEL CARRIER
Filed May 19, 1925
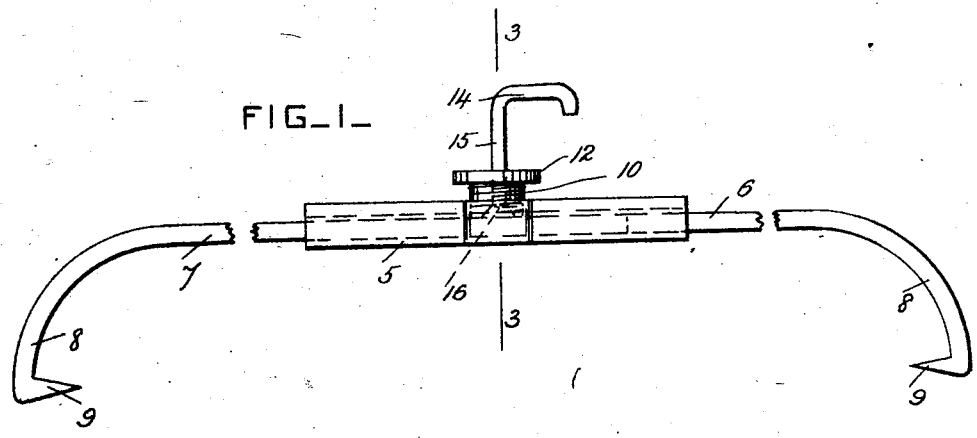
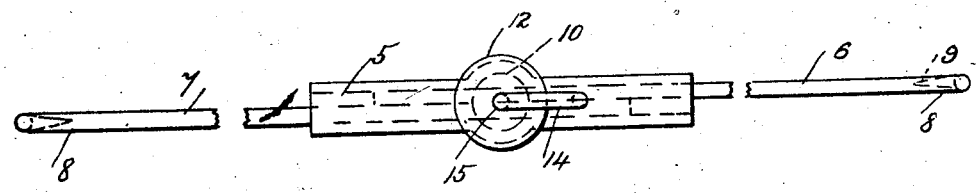
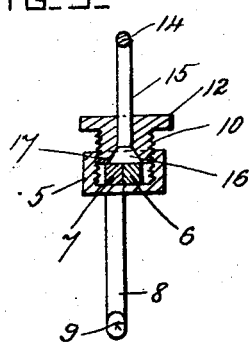

Patented Oct. 6, 1925.

1,556,228

UNITED STATES PATENT OFFICE.

JOHN MERIWEATHER LEWIS, OF WATSONVILLE, CALIFORNIA.

PARCEL CARRIER.

Application filed May 19, 1925. Serial No. 31,293.

*To all whom it may concern:*

Be it known that I, JOHN M. LEWIS, a citizen of the United States, residing at Watsonville, in the county of Santa Cruz and State of California, have invented certain new and useful Improvements in Parcel Carriers, of which the following is a specification.

This invention relates to carriers for boxes and other similar packages and parcels; and it consists of a longitudinally adjustable bail provided with a handle and constructed as hereinafter fully described and claimed.

In the drawings, Figure 1 is a side view of a carrier constructed according to this invention. Fig. 2 is a plan view of the same. Fig. 3 is a cross-section taken on the line 3—3 in Fig. 1.

A tubular guide 5 is provided, and is rectangular in cross-section. Two bars 6 and 7 are arranged side by side in the guide, and have downwardly curved end portions 8 provided with points or hooks 9 for engaging with the box or other article to be carried. These points or hooks may point outwardly or inwardly, according to the shape of the article, and the bars are slid in the guide to adjust them to the size of the article.

A set-screw 10 is screwed into a hole in the upper side of the guide, and bears on the bars 6 and 7, and locks them in the guide after they have been adjusted. The set-screw has a head 12 so that it can be operated by the fingers. A hook-shaped handle 14 is provided, and has a shank 15 provided with a button 16 at its lower end. This shank is swivelled in a central hole in the set-screw, and its button engages with a socket 17 in the set-screw so that the article may be carried from place to place by the handle. This carrier is inexpensive to manufacture, and is not liable to get out of order.

What I claim is:

1. A carrier, comprising a guide, bars supported by the said guide and provided with means for engaging with an article, one of the said bars being slidable longitudinally in the said guide, a locking screw screwed into the guide and bearing on the slidable bar and provided with a central hole and a socket, and a carrying handle provided with a shank which is swivelled in the said hole and socket.

2. A carrier, comprising a guide, bars slidable longitudinally in the guide and provided with means for engaging with an article, a locking screw for both bars screwed into the guide and provided with a central hole and a socket, and a carrying handle provided with a shank which is swivelled in the said central hole and socket.

In testimony whereof I have affixed my signature.

JOHN MERIWEATHER LEWIS.